April 28, 1970  W. M. DAVIS  3,508,707
CHECK DIGIT VERIFIER

Filed Jan. 15, 1968  3 Sheets-Sheet 1

INVENTOR
WILBUR M. DAVIS
BY
ATTORNEY

April 28, 1970      W. M. DAVIS      3,508,707
CHECK DIGIT VERIFIER

Filed Jan. 15, 1968      3 Sheets-Sheet 2

April 28, 1970  W. M. DAVIS  3,508,707
CHECK DIGIT VERIFIER
Filed Jan. 15, 1968  3 Sheets-Sheet 3

United States Patent Office 3,508,707
Patented Apr. 28, 1970

3,508,707
CHECK DIGIT VERIFIER
Wilbur M. Davis, Rochester, Minn., assignor to International Business Machines Corporation, Armonk, N.Y., a corporation of New York
Filed Jan. 15, 1968, Ser. No. 697,843
Int. Cl. G06c 7/04
U.S. Cl. 235—145          14 Claims

ABSTRACT OF THE DISCLOSURE

A transaction recorder incorporating a mechanical verifying device for determining the correctness of information manually entered using a keyboard. An accumulator shaft is rotated incrementally in accordance with the values of keys depressed in a designated field of keybanks and effects interlocking of a subsequent field of keybanks or other apparatus if an incorrect entry is keyed.

BACKGROUND OF THE INVENTION

This invention relates generally to business machines and more particularly to transaction recording devices wherein information is manually entered through a keyboard.

In various accounting or recording devices, an entry is made during each transaction of a multi-digit number or other multiple character symbol utilized for statistical or accounting purposes, usually at a location different from that at which the entry is made. For example, in a sales transaction a catalog number might uniquely identify the item, price, size, color or other characteristics that are useful for sales records, inventory control or reordering purposes. Accuracy of this information is vital to the successful operation of any system which is dependent thereon as a source of data, but the entry of this information is peculiarly subject to error. The entry is commonly made by an employee who is not otherwise the user of the information, and who has limited knowledge of the ultimate use of the information. More important, the multiple digit number is usually large and meaningless to the individual making the entry whereby an inadvertent error is quite likely to pass unnoticed.

It is accordingly necessary that means be provided to indicate when an incorrect entry has been made, preferably by preventing operation of the device to effect entry of the information on the recording means until a correct entry has been made on the keyboard. A common way to implement checking and entry is to include one additional character in the coded number or symbol that serves as a check digit whereby the device can ascertain the correctness of the entry by determining if the sum, or some predetermined weighted sum, of the characters have a specific value. Various systems are used which, depending upon the complexity of the system chosen, eliminate some or all of the most common errors, such as single symbol error, transposition, three symbol interchange and double transposition.

SUMMARY

The present invention is a principally mechanical check digit system for disabling an adjoining field of keys, or other mechanism necessary to enter the keyed information on the record medium until the correct code number has been keyed. In one illustrated embodiment the information is keyed into the keybank and if the interlocked adjoining keybank is inoperative, the operator must determine which symbol or symbols are incorrect and rekey that portion of the entry to permit release of the next keybanks or interlocked portion for operation. In a modified version, the checked digit number or symbol may have a variable number of characters, the number to be checked being controlled, by way of example, by the type of transaction to be recorded on the device.

Using the alternative embodiment, which is structurally more simple, when an error occurs in a code number it is necessary to clear the keyboard and re-enter the coded number correctly to release the interlock and permit the next operation. This embodiment is particularly adaptable for use with a ten-key entry device since the mode of operation is the same, that is, the entire field entry must be cleared if an error occurs. This device can also be used to calculate a check digit from keyed data. For example, an emitter could be used to establish the sum or weighted sum of the keyed data with the emitter contact point at the end of the entry uniquely identifying the check digit number.

The structure of the present invention provides a simplified compact mechanical device for verification of the correctness of the number or multiple character symbol entered into a recording device.

DETAILED DESCRIPTION

Figure 1:
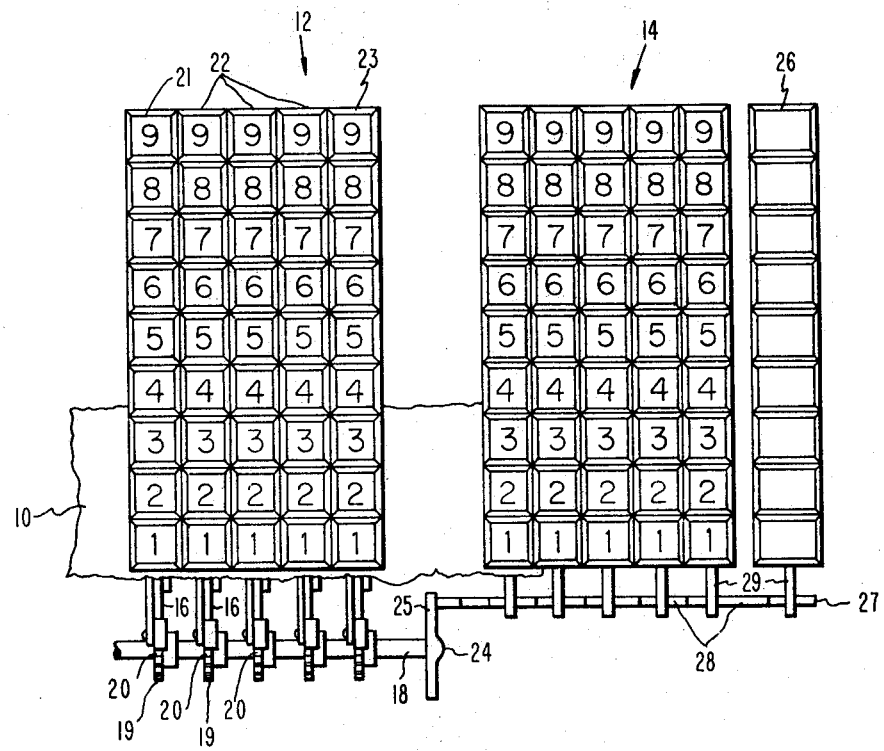
FIGURE 1 is a schematic showing of portions of a keyboard, check digit accumulator and interlock device of a transaction recording unit utilizing the mechanical verifier of the present invention.

Referring to the drawings, FIGURE 1 schematically represents a series of keybanks with the operating portion of the key members projecting through a housing 10. The keybanks are arranged in a first field 12 for entering coded information and a second field 14 for the entering of a money amount and the exercise of control functions. Each keybank of the first field includes a differential slide 16 that is longitudinally movable in incremental amounts corresponding in magnitude to the value assigned the key actuated. A series of racks 20 respectively attached to the differential slides 16 rotate shaft 18 by engaging the associated gear 19 respectively carried by the shaft. As illustrated, the four keybanks 21 and 22 at the left of the first keybank field 12 contain the coded information to be entered relating to the transaction. The keybank 23 at the right of the first field 12 is used to enter a meaningless check digit which is significant only for the purpose of providing a predetermined coded value to the number entered in the first keybank field 12. In the device illustrated keybank 23 serves to rotate shaft 18 to position the rise portion 24 of face cam 25 in engagement with the end of the lockout bar 27 and move the bar projections 28 out of engagement with the key lock slides 29 of the keybanks in the second field 14. Although the last keybank at the right side of the field for checking purposes, it will be evident that any of the keybanks could be utilized for entering the check digit.

In the position shown in FIGURE 1, the projections 28 of the lockout bar 27 are received in grooves 30 in each of the keylock slides 29 (FIGURE 2) preventing motion thereof and accordingly preventing operation of the keys in the second keybank field 14 until released. The check digit of keybank 23 is chosen to rotate the shaft to the release position when the first four significant characters of the coded number have been entered in keybanks 21 and 22 of the first field. After a correct entry the operator may proceed to operate the keys of the second keybank field 14 and subsequently select one of the motor keys in keybank 26 to initiate the motorized terminal portion of the cycle, entering the keyed information in the accumulators or other information storage mechanism of the transaction recorder and restoring the keyboard to the initial non-actuated condition.

Figure 3:
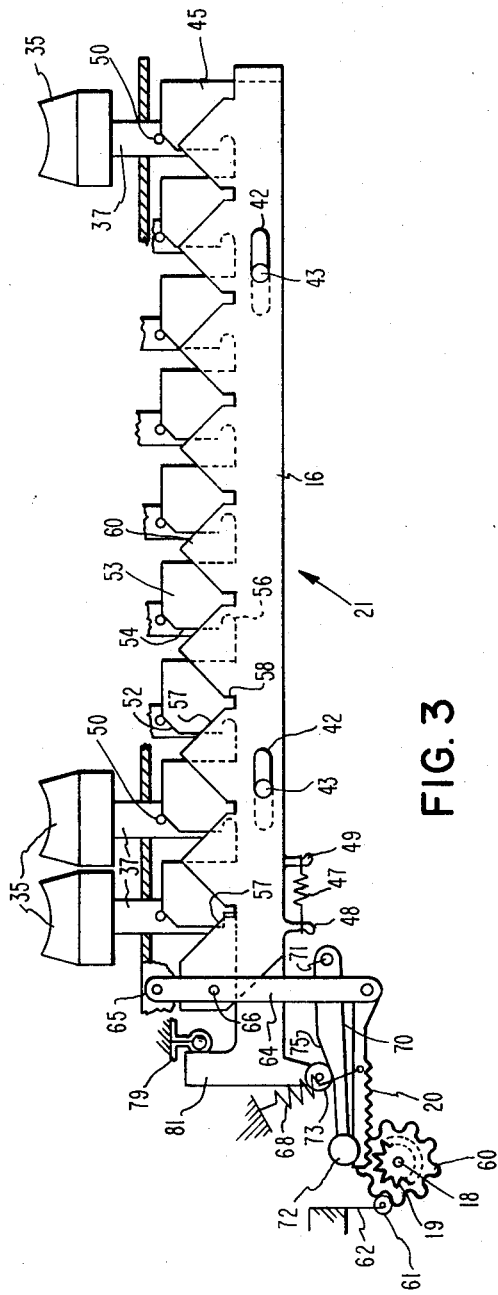
FIGURE 3 is an elevation partially broken away of a keybank utilizing a first embodiment of the present invention.
Figure 4:
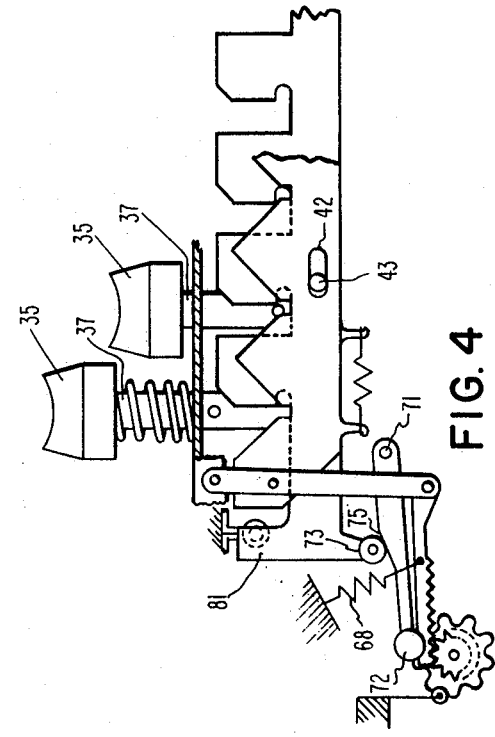
FIGURE 4 shows a portion of the keybank of FIGURE 2 with one key thereof in a partially actuated position.

Referring to FIGURES 3 and 4, the keybank 21 includes a series of nine keys 35 and keystems 37 mounted in a frame 39 for vertical reciprocating movement. Also carried by the frame 39 is differential slide 16 mounted with longitudinal apertures 42 surrounding stationary pins 43 to permit limited longitudinal motion. A keylock slide 45 is similarly mounted about the pins 43 for limited horizontal reciprocating motion. The slides 16 and 45 are urged toward the position shown in FIGURE 3 by a tension spring 47 that is connected at its ends to the depending ears 48 and 49 extending from differential slide 16 and keylock slide 45 respectively. When a key 35 is depressed, a laterally projecting stud 50 on the keystem 37 engages the inclined surface 52 of the associated projection 53 on keylock slide 45 camming the keylock slide to the right as viewed in FIGURES 3 and 4 until the vertical surface 54 is reached. The keylock slide 45 thereafter remains stationary as the keystem moves downwardly until keystem stud 50 passes the lower terminus of the surface 54 at which time the keylock slide through the medium of the biasing spring 47 moves to the left as viewed in FIGURE 3, capturing the stud 50 in the groove 56 and retaining the actuated key and keystem captive in the depressed position. During the period when keystem stud 50 moves downwardly and is in engagement with the vertical surface 54, the pin also engages the confronting inclined surface 57 of one of the projecting portions of the differential slide causing the differential slide 16 to be moved to the left as viewed in FIGURES 3 and 4 until the stud 50 is received in the groove 58 at the base of the inclined surface 57. It will be observed that the periodic spacing between projections 60 of differential slide 16 are greater than the spacing between adjoining keystems 37 whereby each key causes a length of travel of differential slide 16 differing from that caused by each of the other keys within the keybank. Further, all engagement between keystem studs 50 and differential slide inclined surfaces 57 occurs during the period when the keylock slide is displaced by engagement of the associated keystem stud 50 with the vertical surface 54.

Rotatably mounted within the device is shaft 18 on which is carried a series of gears 19 each respectively engageable by movable rack 20 to cause rotation of the shaft. A gear 60 also mounted on shaft 18 for rotation in unison therewith, engages a roller detent 61 carried by the free end of a leaf spring 62 which is mounted on the housing of the machine and serves to releasably retain shaft 18 at any incremental position of rotational travel. A lever 64 is pivotally connected at one end about a pin 65 to keybank frame 39, has an intermediate connection about a pin 66 carried by differential slide 16 and at the opposite end is pivotally connected to the end portion of rack 20. The distance of the pivotal connection between rack 20 and lever 64 from the axis of pin 65 is greater than the distance between the axes of pins 65 and 66 causing the incremental movements of differential slide 45 to cause greater lineal increments of movement of rack 20. Accordingly, the relatively small increments of differential slide movement are multiplied by the transfer through lever 64 to enlarge the tooth spacing of the rack 20 and facilitate the distinction between the various increments of movement.

The rack 20 is normally pivoted upward out of engagement with the gear by means of a biasing tension spring 68. An interposer lever 70 is pivoted to the keybank frame 39 at one end about a pin 71 and at the opposite end carries a roller 72 which engages the upper longitudinal surface of rack 20. The upper surface of the interposer lever 70 is engaged by a roller 73 carried by a projecting portion of keylock slide 45. In operation, as best seen in FIGURE 4, the keystem 37 is depressed causing the keystem stud 50 to displace the keylock slide 45 to the position illustrated. Simultaneously, roller 73 engages interposer lever 71 along the inclined surface 75 causing the rack 20 to be depressed into engagement with the accumulator shaft gear 19. During the period when the rack 20 is maintained in engagement with gear 19 by the displacement of keylock slide 45, displacements of differential slide 16 by further downward travel of the keystem stud 50 causes lever 64 to move rack 20 longitudinally, while engaging gear 19, an incremental amount corresponding to the displacement of differential slide 16. As specifically illustrated in FIGURES 3 and 4, depression of the keystem 37 farthest left causes the combined differential slide displacement and motion multiplication effected by the arrangement of the pivot axes associated with lever 64 to displace the rack 20 an amount equivalent to one tooth spacing. In the keybank 21 illustrated, the non-uniformity of spacing between the keystems 37 and the differential slide projections 60 is so arranged that each succeeding keystem moves rack 20 an incremental amount increased by one tooth spacing whereby each key causes a different increment of rotation of the accumulator shaft 18.

To prevent operation of keys simultaneously in more than one keybank a ball lockout device 79 is provided of conventional design including a series of balls retained in a channel within a housing which is slotted to permit entry of a keylock slide projection 81. The total spacing between the series of balls is sufficient to permit the passage of only one keylock slide portion therethrough. In the operative position shown in FIGURE 4, the upward tab portion 31 of keylock slide 45 has moved into the channel containing the lockout balls to consume the spacing therebetween and prevent the simultaneous actuation of the keylock slide of any other bank in the associated field of keybanks.

When a key has been erroneously depressed, depression of the correct key will not only properly set up the keybank, but also will correct the entry in the check digit accumulator. The differential slide 16 is moved only when the rack 20 is in engagement with gear 19. Accordingly, following the entry of an amount in the accumulator by depression of a key, depression of another key of the keybank causes the rack 20 to re-engage gear 19 and add or subtract an incremental amount of rotation equivalent to difference in the value of the depressed key as compared to the key previously depressed.

Figure 2:
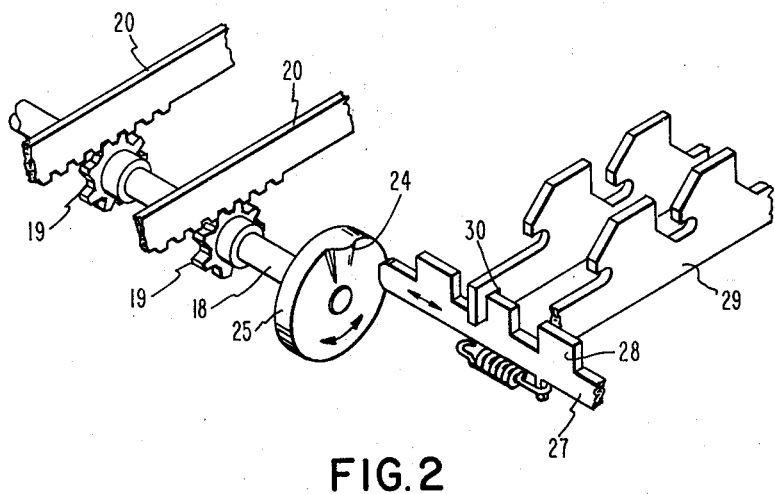
FIGURE 2 is an enlarged isometric view of the mechanical interlock illustrated in FIGURE 1.
Figure 5:
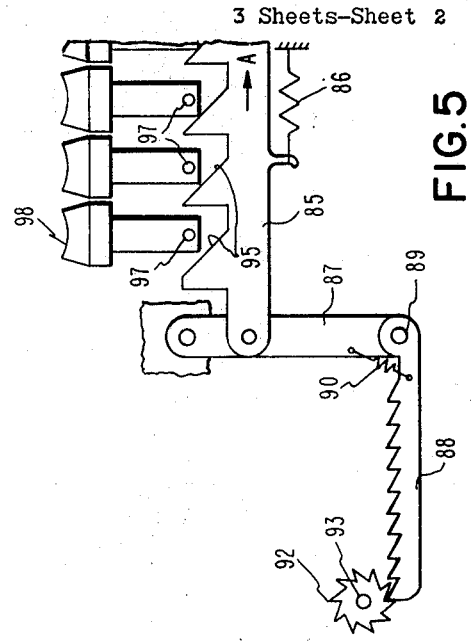
FIGURE 5 is a partial elevation view of a keybank partially broken away and partially in section showing an alternative embodiment of the mechanical verifier of the present invention.

FIGURE 5 is a schematic illustration of an alternative embodiment of the invention. A differential slide 85 is biased in the direction of arrow A by a tension spring 86 and is pivotally connected to a lever 87 to transmit differential slide motion to a rack 88. Rack 88 is pivotally connected at one end about a pin 89 and urged in one pivotal direction thereabout by the tension spring 90. The rack is continuously biased into engagement with a toothed accumulator wheel 92 that is carried by a shaft 93. The shaft 93 provides the same interlocking function and would be connected to auxiliary mechanism or a second field of keys in the same manner as that of the previous embodiment which is illustrated in FIGURE 2.

The inclined actuating surfaces 95 of the differential slide have a spacing differing from the spacing between keystem studs 97 to effect an incremental movement associated with each keystem actuation differing from the magnitude of movement caused by depression of any other key of the keybank. As shown, key 98 will upon depression move rack 88 longitudinally one tooth space and each succeeding keystem will cause a longitudinal movement having an incremental magnitude one tooth space greater than the keystem next adjoining on the left. Cooperation between biased rack 88 and gear 92 serves as a ratchet mechanism which permits the gear to be rotated by a similar rack on an adjoining keybank differential slide. Accordingly, it is necessary that a lockout device, not shown, similar to that of FIGURES 3 and 4 be provided to prevent simultaneous operation of keys in more than one keybank in the keying field associated with the accumulator shaft 93.

As shown in the drawings herein, the differential slides of the keybanks used for the entry of coded information are each designed to impart a movement to the check mechanism accumulator shaft in an incremental amount equivalent to the value of the key depressed. Accordingly the check mechanism accumulator shaft accumulates the total value of the sum of the digits depressed. The shaft is rotated one complete revolution by ten increments with one of the ten shaft rotational positions having a cam mounted thereon to free other mechanism of the device for a subsequent operation.

One system utilizes multiples of nine wherein the check digit accumulator shaft accomplishes one rotation by nine increments or a multiple of nine increments and the check digit which forms one character of the coded entry brings the digit sum to the next successive multiple of nine. This is commonly known as a modulo 9 check system which detects errors in single character miskeying, however, this does not detect the second most common keying error that of two digit transposition. Further errors including two digit transposition errors can be detected by use of a modulo 10 system which functions in ten increments of movement and wherein alternate rows are given weighted values such as by doubling the digit value and adding one to the product where the value of the digit doubled is five or more. In this system the weighted values in such alternate rows are for 1 through 9 respectively 2, 4, 6, 8, 1 ,3, 5, 7 and 9. This system can be used in the device of FIGURES 1 through 4 by modifying the differential slides of keybanks 21, the weighted values above can be achieved merely by modifying the distance that the differential slide of keybanks 22 is moved by each key in the keybank through a change in the position of the terminal depressions adjacent the wedging surfaces engaged by the keystem pins. There are many further modifications of these systems and also more complex systems which are effective to preclude further less common forms by keying errors which can also be accommodated by differential slide modification.

Figure 6:
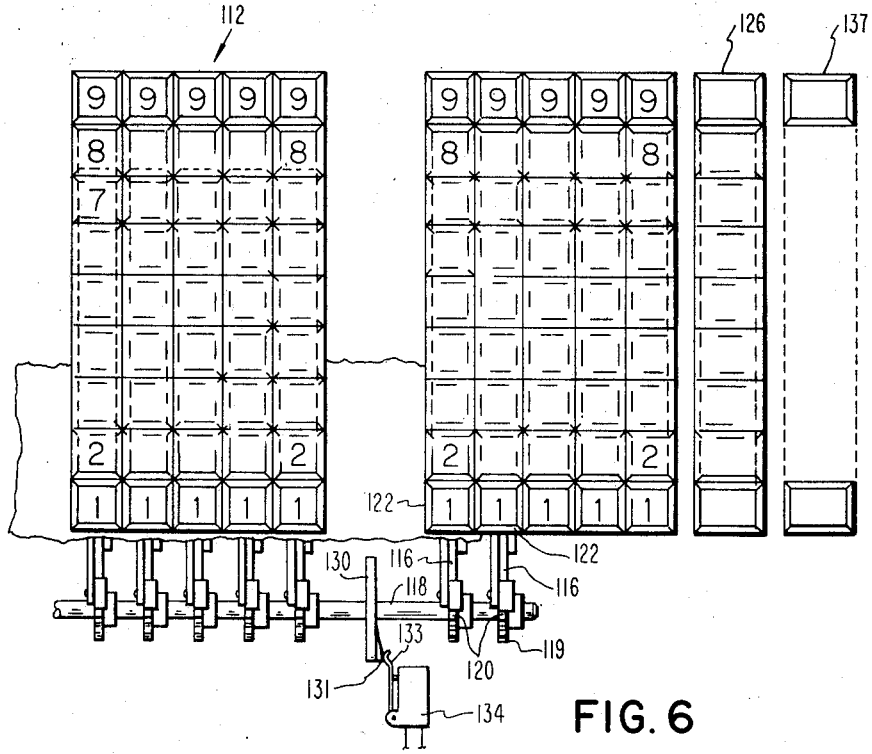
FIGURE 6 is a schematic showing of portions of a keyboard similar to FIGURE 1 with modification for adaptation to numbers or symbols with differing numbers of characters.
Figure 7:
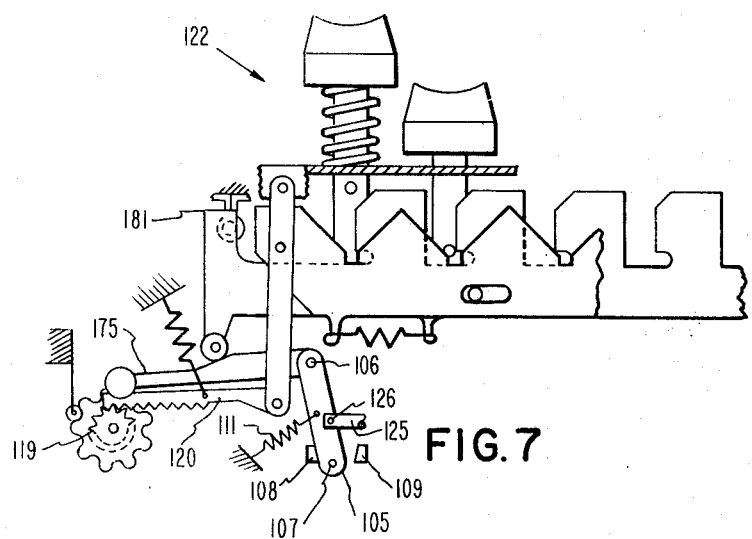
FIGURE 7 is keybank assembly portion similar to FIGURE 4 showing a modified form thereof.

The device of FIGURES 1 through 4 can be modified as shown in FIGURES 6 and 7 to enable the use of a check digit with numbers of extended length. FIGURE 6 shows a keyboard similar to that of FIGURE 1 with an extended check digit accumulator shaft 118 and keybanks 122 in the next successive field having differential slides 116 and racks 120 for driving the accumulator shaft. The keybanks 122 differ from those of the first field 112, which are constructed as shown in FIGURES 3 and 4, by being selectively operable to cause rotation of accumulator shaft 118 as shown in FIGURE 7. The keybank 122 of FIGURE 7 has an interposer 175 which is pivotally connected to a link 105 about a pin 106. The link 105 is pivotable about a stationary axis established by pin 107 between one terminal position in abutting relation with a stop 108 as shown in FIGURE 7 and a second terminal position abutting stop 109. Link 105 is urged toward the position shown in FIGURE 7 by a tension spring 111 and is movable to the second position in abutting relation with stop 109 by a tensile force on rod 125 which is pivotally connected to an intermediate portion of link 105 about pin 128.

As shown in FIGURE 6, the accumulator shaft 118 carries a face cam 130 with a projection 131 thereon which at one rotational position depresses a switch arm 133 to close a contact in switch 134. Switch 134 is electrically in series with the motor keys of keybank 126 thereby preventing cycling of the device until accumulator shaft 118 is rotated to the correct position to cause actuation of switch 134.

The keybanks 122 with links 105 positioned as shown in FIGURE 7 function in the same manner as the keybank shown in FIGURES 3 and 4, that is, when an entry is made the value thereof is entered as units of rotation of the accumulator shaft 118. When the link 105 is pivoted to the second position in abutting relation with the stop 109, the interposer lever 175 is withdrawn to a position whereat movement of the keylock slide 181 no longer causes the interposer lever 175 to engage rack 120 with accumulator shaft gear 119.

In normal operation, a tensile force is applied to shaft 125 moving link 105 to abutting relation with stop 109. The keybanks 122 are thereupon not operable to actuate the accumulator shaft 118. Key 137 is one of a series of keys utilized to set up the mechanism of the device for a particular mode of operation. When it is desired to utilize the device to center an alternative check digited number seven characters in length, key 137 is depressed which, through mechanical or electrical means not shown, causes the tensile force on rod 125 to be released, permitting spring 111 to urge link 105 against stop 108 and interposer 175 to the position shown in FIGURE 7 causing racks 120 to enter the value of keyed entries from keybanks 122 into the check digit accumulator.

While the invention has been particularly shown and described with reference to preferred embodiments thereof it will be understood by those skilled in the art that the foregoing and other changes in form and details may be made therein without departing from the spirit and scope of the invention.

What is claimed is:

1. In a machine for entering manually keyed information from a keyboard; means for actuating a recording means,
    a plurality of keys for manual entry of information;
    a differential slide engageable by said keys, each of said keys upon depression thereof being operable to impart an incremental quantity of longitudinal movement to said slide corresponding to the value of the key depressed;
    accumulator means actuated by movement of said differential slide; and
    interlock means for preventing the operation of said means for actuating said recording means unless said accumulator has a predetermined amount entered therein.

2. In a machine for entering manually keyed information from a keyboard; means for actuating a recording means, a first plurality of keybanks for manual entry of information;
    a first plurality of differential slides respectively connected to and forming an operating portion of said first plurality of keybanks, each key of said keybanks upon depression thereof being operable to impart a longitudinal movement to said differential slide connected to said keybank, said longitudinal movement imparted by each key in one of said keybanks being different in magnitude from the movement imparted by every other key in said keybank;
    mechanical means driven by longitudinal movement of each of said differential slides;
    interposed means engageable by said mechanical means and operable to prevent operation of said means for actuating said recording means when said mechanical means is not disposed in a selected predetermined position.

3. The machine of claim 2 wherein said mechanical means comprises a shaft extending transversely with respect to said differential slides and gear means carried by said shaft for rotation in unison therewith and said machine further comprises a plurality of rack members respectively connected to said differential slides and operable to translate longitudinal movement of the associated differential slide to incremental rotation of said shaft.

4. The machine of claim 3 wherein said racks are normally disposed out of engagement with said gear means, said machine further comprising a plurality of second slide members respectively forming a portion of said first plurality of keybanks and movable from a first position to a second position;
   means connected to each of said second slide members for causing engagement between the rack member connected to the differential slide of such keybank and said gear means when said second slide member is in said second position;
   means precluding concurrent positioning of more than one of said slide members in the respective second position thereof; and
   means for preventing movement of each of said differential slides unless the second slide member associated with the respective keybank is in said second position.

5. The machine of claim 3 wherein said gear means comprises a plurality of ratchet wheels, said racks are each respectively biased to a position of engagement with said plurality of ratchet wheels, and said machine further comprises:
   means for preventing concurrent movement of more than one of said differential slides whereby simultaneous keying of keys in two or more keybanks is precluded.

6. In a machine having a manually operable keyboard comprising a plurality of keybank assemblies each including a series of depressible keys, means for actuating a recording means, and means interconnecting said keybank assemblies with said recording means, a check digit mechanism comprising:
   an accumulator shaft;
   counting gear means carried by said shaft;
   a rack pivotally connected to each of said keybanks and engageable with said counting gear means to incrementally rotate said shaft in response to the depression of a key in the keybank connected thereto;
   disabling means for selectively preventing operation of said interconnecting means; and
   means connected to said accumulator shaft operable to disengage said disabling means to permit operation of said interconnecting means when the digital sum of the increments of rotation of said accumulator shaft by operation of a predetermined plurality of said keybanks is equivalent to a predetermined sum or a multiple thereof.

7. The machine of claim 1 wherein each of said plurality of keybank assemblies comprises:
   a differential slide mounted for confined motion in a single plane and connected to said rack to impart motion of said differential slide to said rack, said differential slide being incrementally movable by depression of said keys, the magnitude of the movement imparted by any of said keys in said assembly being different from that imparted by any other key of said assembly.

8. The machine of claim 7 further comprising selectively operable control means connected to at least one of said keybank assemblies for selectively preventing rotation of said accumulator shaft by depression of a key therein, whereby said machine may be utilized with check digited symbols having a varying number of characters.

9. The machine of claim 7 wherein each of said keybank assemblies further comprises:
   a second slide member movable from a first position to a second position by operation of one of said keys, said rack being pivotally connected to said assembly and normally pivoted out of contact with said gear means; and
   interposer means operable to move said rack to a position of engagement with said gear means when said second slide member is in said second position, said differential slide member being movable by one of said keys only when said second slide member is in said second position.

10. The machine of claim 9 further comprising selectively operable control means connected to at least one of said keybank assemblies for selectively preventing operation of said interposer means to engage said rack with said gear means.

11. The machine of claim 9 further comprising:
   lockout means mounted on said machine and engageable with said second slide member of said plurality of keybank assemblies for permitting only one of said second slide members to be disposed in the respective second position, whereby simultaneous operation of keys in a plurality of keybanks is prevented.

12. The machine of claim 10 further comprising:
   linkage means interconnecting said rack and said differential slide for imparting increments of movement of said differential slide to said rack in increased magnitude; and
   detent means for releasably retaining said accumulator shaft in rotational positions determined by driving engagement between said racks and said counting gear means.

13. The machine of claim 7 wherein said counting gear means comprises a plurality of ratchet wheels mounted on said accumulator shaft for pivotal movement in unison therewith and said racks and respectively biased toward a position of engagement with the associated ratchet wheel.

14. The machine of claim 13 wherein said rack is pivotally connected to said differential slide, each keybank includes a plurality of keys with each key within one of said keybanks imparting upon depression thereof a total movement composed of a number of increments of movement different from that imparted by any other key within said one keybank and each tooth spacing on said rack is equivalent to one of said increments of movement.

References Cited

UNITED STATES PATENTS

| 2,684,200 | 7/1954 | Starreveld et al. | 235—61 |
| 2,857,100 | 10/1958 | Franck et al. | 235—153 |
| 3,049,293 | 8/1962 | Garvey et al. | 235—145 X |
| 3,105,636 | 10/1963 | Greene | 235—60.25 |
| 3,186,639 | 6/1965 | Staller | 235—60 |
| 3,268,162 | 8/1966 | Hohmann. | |

RICHARD B. WILKINSON, Primary Examiner

S. A. WAL, Assistant Examiner

U.S. Cl. X.R.

235—60

PO-1050
(5/69)

UNITED STATES PATENT OFFICE
CERTIFICATE OF CORRECTION

Patent No. 3,508,707    Dated April 28, 1970

Inventor(s) Wilbur M. Davis

It is certified that error appears in the above-identified patent and that said Letters Patent are hereby corrected as shown below:

Column 7, line 62, for "claim 1" read --claim 6--

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents